(12) United States Patent
Cheng

(10) Patent No.: US 6,934,518 B2
(45) Date of Patent: Aug. 23, 2005

(54) MOBILE PHONE WITH A HIDDEN INPUT DEVICE

(75) Inventor: Yung-Fa Cheng, Taipei (TW)

(73) Assignee: Quanta Computer Inc. (TW)

( * ) Notice: Subject to any disclaimer, the term of this patent is extended or adjusted under 35 U.S.C. 154(b) by 448 days.

(21) Appl. No.: 10/127,007

(22) Filed: Apr. 19, 2002

(65) Prior Publication Data
US 2003/0087609 A1 May 8, 2003

(30) Foreign Application Priority Data
Nov. 5, 2001 (TW) .................................... 90218927 U

(51) Int. Cl.⁷ .................................................. H04B 1/38
(52) U.S. Cl. .................. 455/90.3; 455/575.1; 455/90.1; 455/569.1; 455/575.4; 455/566; 455/95; 379/428.01; 379/433.12; 379/433.13
(58) Field of Search ............................ 455/90.3, 575.1, 455/95, 575.4, 566, 569.1, 90.1

(56) References Cited

U.S. PATENT DOCUMENTS 6,009,338 A * 12/1999 Iwata et al. .............. 455/575.4
6,415,138 B2 * 7/2002 Sirola et al. ............... 455/90.1
6,424,843 B1 * 7/2002 Reitmaa et al. ............ 455/566
6,427,078 B1 * 7/2002 Wilska et al. ............ 455/550.1
6,535,461 B1 * 3/2003 Karhu ......................... 368/10
6,549,789 B1 * 4/2003 Kfoury .................... 455/550.1
6,658,268 B1 * 12/2003 Bodnar et al. ........... 455/556.2

FOREIGN PATENT DOCUMENTS

TW         294875         1/1997

* cited by examiner

Primary Examiner—Marceau Milord
(74) Attorney, Agent, or Firm—Merchant & Gould P.C.

(57) ABSTRACT

A mobile phone with a hidden input device. The mobile phone comprises a main body, and an input device coupled to the main body to input data and rotatably connected to the main body between a first position and a second position by a rotating device, wherein the input device has a visible portion with a plurality of first input elements covered by the main body when the input device is fixed in the first position, and a hidden portion with a plurality of second input elements appearing when the input device is fixed in the second position.

8 Claims, 7 Drawing Sheets

US 6,934,518 B2

MOBILE PHONE WITH A HIDDEN INPUT DEVICE

BACKGROUND OF THE INVENTION

1. Field of the Invention

The present invention relates to a mobile phone with a hidden input device, more particularly, to a mobile phone with a rotatably hidden alphabetical keyboard.

2. Description of the Related Art

FIG. 1 (Prior Art) is a schematic structural diagram of a mobile phone. Generally, the mobile phone (100) comprises a main body (110) with a keyboard (120). The keyboard (120) represents a standard telephone keyboard. In FIG. 1, the keyboard (120) includes ten number keys and two function keys such as "1", "2", "3", "4", "5", "6", "7", "8", "9", "0", "*", and "#".

Moreover, the mobile phone (100) in prior art also has functions to enter alphabetical characters, Chinese characters, or specific functional options through dedicated software. In FIG. 1, a user can enter alphabetical characters by the twelve keys of the keyboard (120). For example, pressing "3" once generates an alphabetical character, "D", and pressing "3" twice, generates an alphabetical character, "E". Thus, users can enter different characters or functional options by the standard telephone keyboard while maintaining space and weight considerations for the mobile phone (100).

When entering a long alphabetical string by the keyboard (120) of the conventional mobile phone (100), however, it is inconvenient and confusing when pressing the same key several times to choose different characters.

SUMMARY OF THE INVENTION

Accordingly, an object of the present invention is to provide a mobile phone with small size and a dedicated keyboard, designed to easily input different alphabetical characters.

The present invention provides a mobile phone with a hidden input device, comprising a main body and an input device. The input device is coupled to the main body to input data and rotatably connected to the main body between a first position and a second position by a rotating device, wherein the input device has a visible portion with a plurality of first input elements covered by the main body when the input device is fixed in the first position, and a hidden portion with a plurality of second input elements appearing when the input device is fixed in the second position.

The first input elements of the mobile phone of the invention comprise a plurality of keys, and the second input elements comprise a plurality of keys or a touch pad. Moreover, the first input elements are used to enter numbers when the input device is fixed in the first position, and the first elements and the second elements input alphabetical characters and a plurality of specific functional options.

The input device of the mobile phone mentioned above also comprises a flexible printed circuit board (FPCB) to transmit the signal from the input device to the main body. The main body also comprises a first node and a second node, wherein the first node conducts the flexible printed circuit board of the input device in the first position to receive the signal from the input device in the first position, and the second node conducts the flexible printed circuit board of the input device in the second position to receive the signal from the input device in the second position.

A user generally dials a phone number only by the number keys on the mobile phone of present invention when the input device is fixed in the first position, and can enter alphabetical characters or functional options when the input device is rotated and fixed in the second position. Therefore, the mobile phone of the present invention is easily carried when the input device is fixed in the first position, and is more convenient to enter alphabetical characters than the mobile phone of the prior art when the input device is expanded and fixed in the second position like a standard keyboard.

The mobile phone with a hidden input device of the present invention can exchange the positions of keys with specific functions on the visible portion or the hidden portion through dedicated software according to the utility rate.

BRIEF DESCRIPTION OF THE DRAWINGS

These and other features, aspects, and advantages of the present invention will become better understood with reference to the following description, appended claims and accompanying diagrams where:

DETAILED DESCRIPTION OF THE PREFERRED EMBODIMENTS

Figure 2:
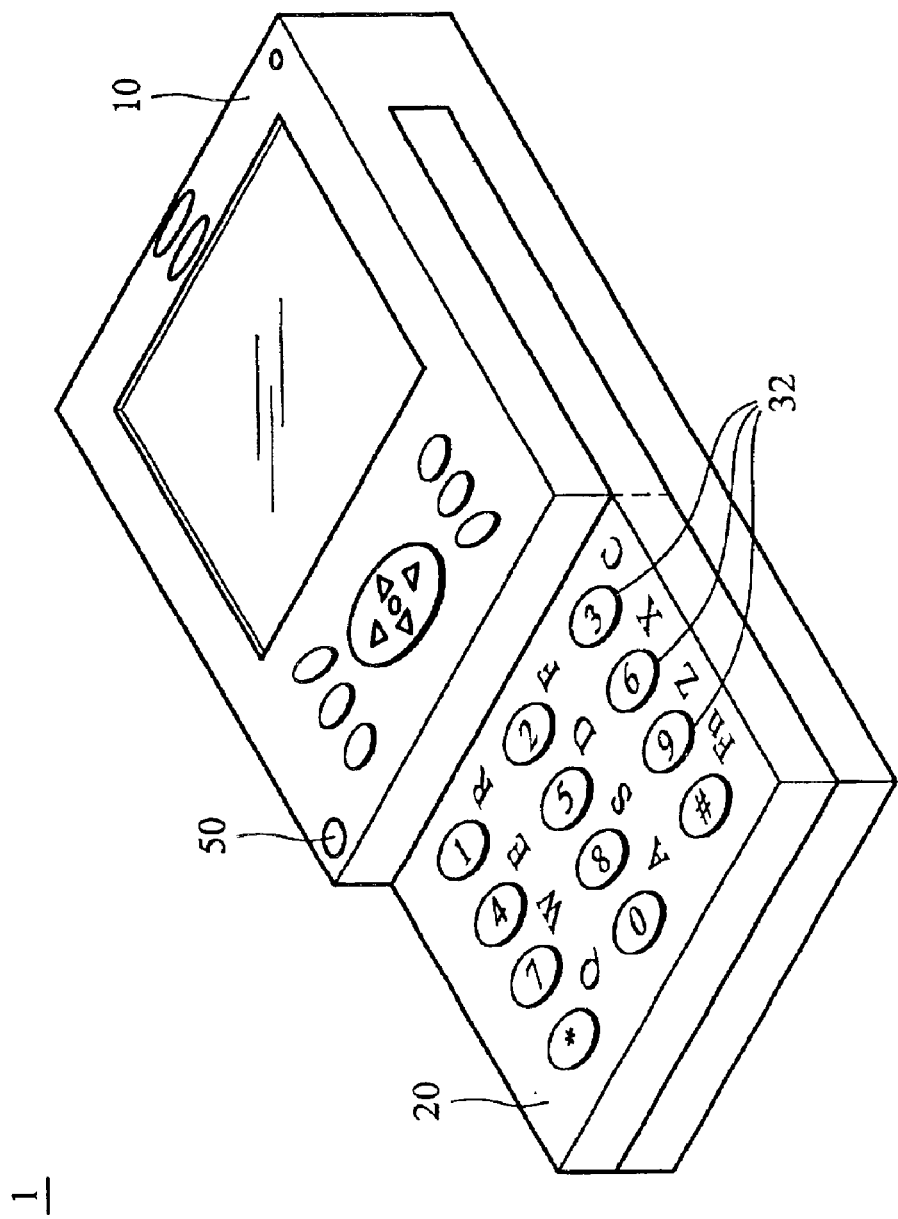
FIG. 2 is a three-dimensional diagram of the mobile phone of the first embodiment.
Figure 3B:
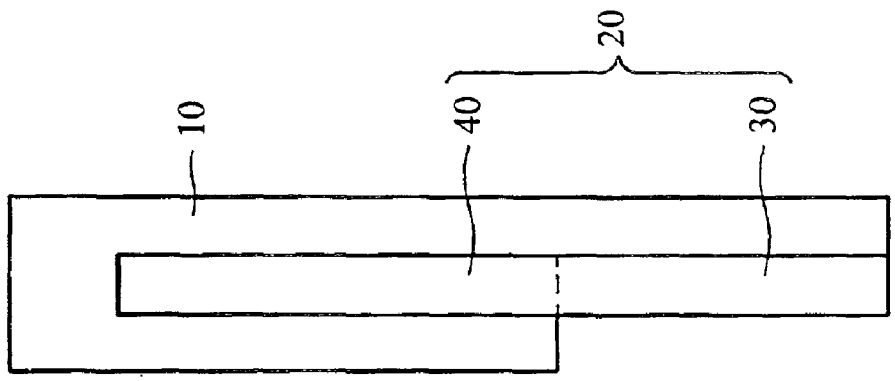
FIG. 3b is a lateral view of the input keyboard in the first position of the first embodiment.
Figure 3A:
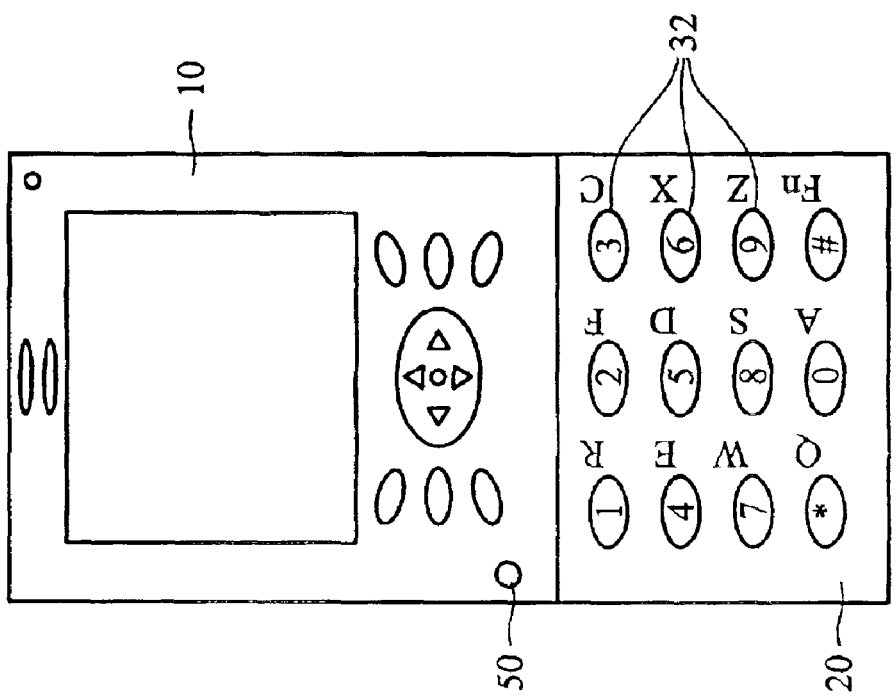
FIG. 3a is a front view of the input keyboard in the first position of the first embodiment.
Figure 4:
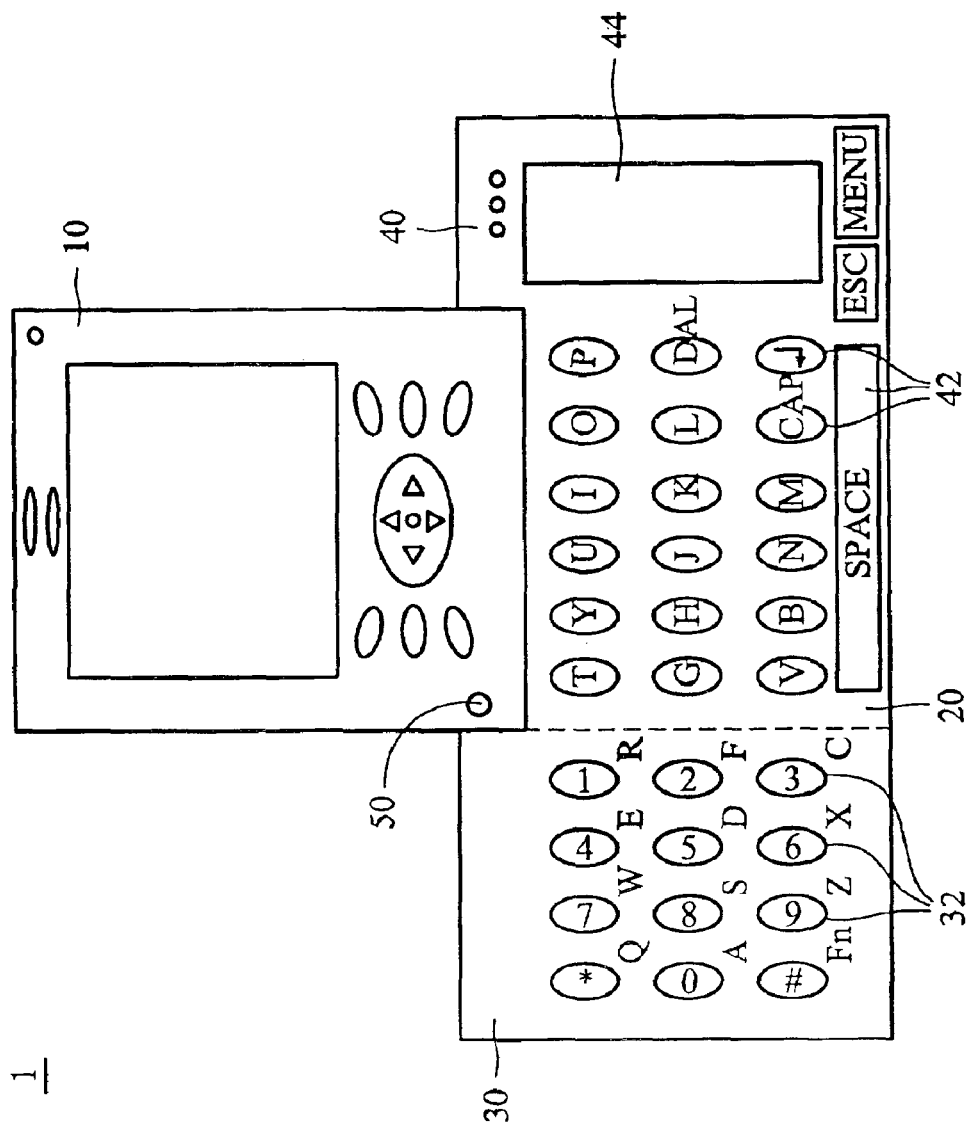
FIG. 4 is a front view of the input keyboard in the second position of the first embodiment.

In FIG. 2 to FIG. 4, the first embodiment of the present invention is a mobile phone (1) with a hidden input device (20). The mobile phone (1) comprises a main body (10) and an input device (20), which is similar to the keyboard in the prior art. A rotating device such as a shaft (50) in FIG. 2 fixes the input device (20) to the main body (10) so that the input device (20) rotates relative to the main body (10).

The input device (20) has a visible portion (30) and a hidden portion (40). FIG. 2 only shows the visible portion (30) when the input device (20) is fixed in the first position. According to the front view in FIG. 3a and the lateral view in FIG. 3b, the main body (10) totally covers the hidden portion (40) so that a user only uses the visible portion (30), which is similar to the keyboard in the prior art, of the input device (20) to input data.

Figure 1:
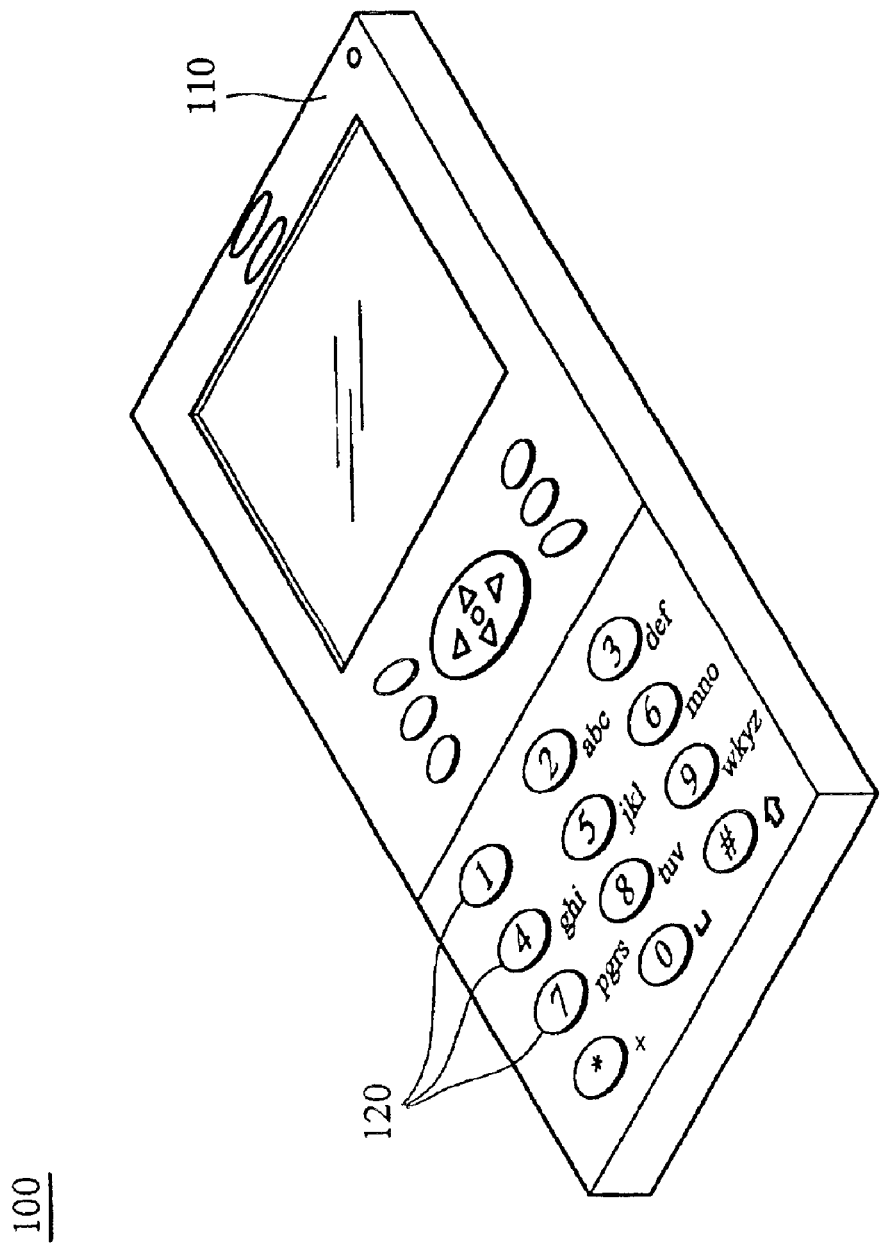
FIG. 1 (Prior Art) is a schematic structural diagram of a mobile phone.

In FIG. 2 and FIG. 3a, the visible portion (30) has a plurality of first input elements, or a plurality of keys (32). The keys (32) are designed similarly to the keyboard (120) of the usual mobile phone (100) in FIG. 1 and include ten number keys and two function keys such as "1", "2", "3", "4", "5", "6", "7", "8", "9", "0", "*", and "#" to input data.

Thus, the functions of the input device (20) in the first position are the same as the mobile phone (100) in FIG. 2.

To enter symbols such as alphabetical characters or other functional options such as switching case, users rotate the input device (20) relative to the main body (10) to the second position. For example, users rotate the input device (20) 90 degrees clockwise to the second position. The second position of the input device (20) is accordingly perpendicular to the first position of the input device (20). In FIG. 4, the main body (10) does not cover the hidden portion (40) so that the whole input device (20) can be used.

In FIG. 4, when the input device (20) is fixed in the second position, the visible portion (30) and the hidden portion (40) form a complete alphabetical keyboard. The hidden portion (40) has a plurality of second input elements such as a plurality of keys (42) and a touch pad (44) to input alphabetical characters. The keys (32) of the first input elements set on the visible portion (30) are also used to input alphabetical characters. In FIG. 4, the key, which is used to input "1" when the input device is fixed in the first position, enters "R" when the input device is fixed in the second position. Moreover, Some of the keys (32) are used to input functional options such that the key (32), originally used to input "#", acts as a function key "Fn".

Figure 6:
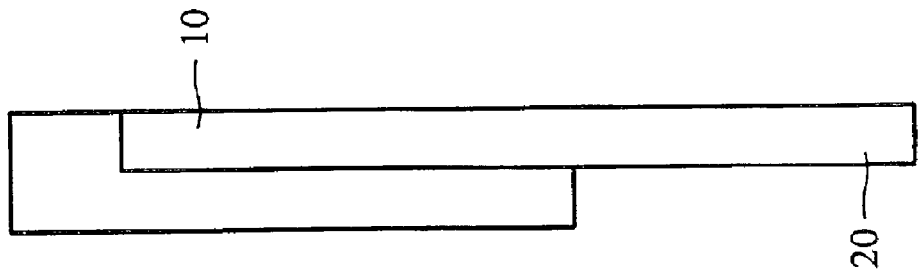
FIG. 6 is a lateral view of the mobile phone of the second embodiment.
Figure 5:
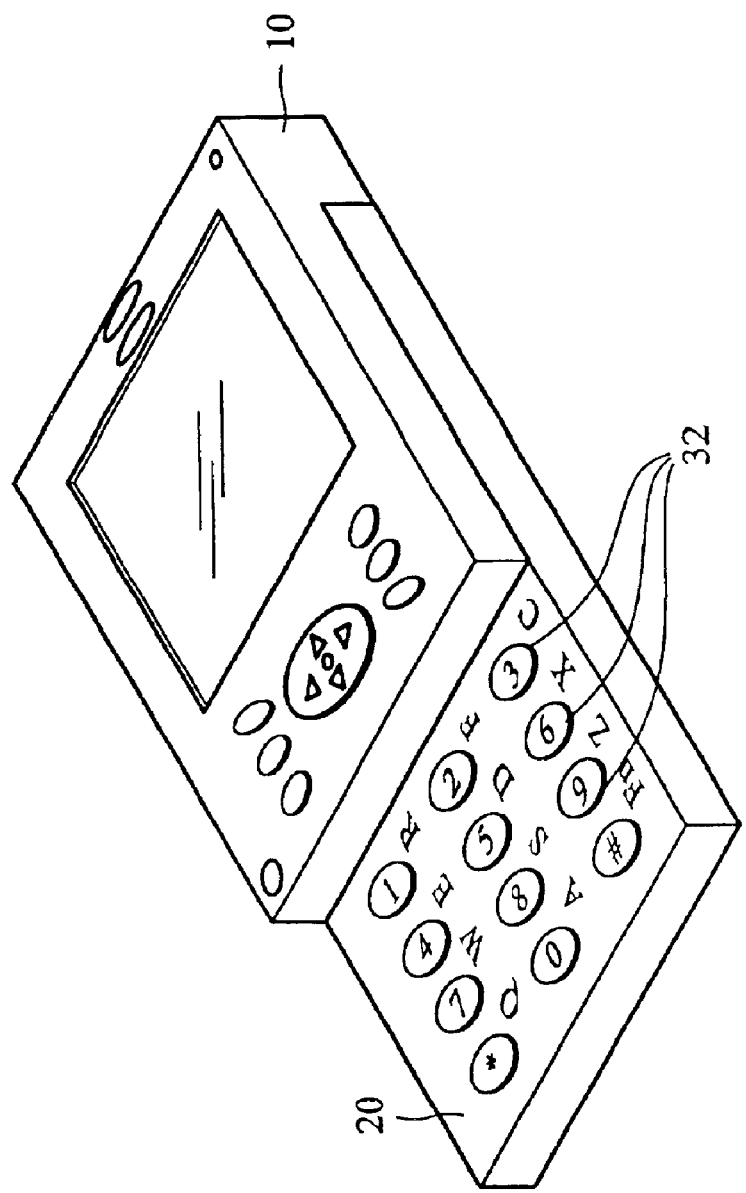
FIG. 5 is a three-dimensional diagram of the mobile phone of the second embodiment.

FIG. 5 is a three-dimensional diagram of the mobile phone of the second embodiment, and FIG. 6 is a lateral view of the mobile phone of the second embodiment. In FIG. 5 and FIG. 6, the front view of the mobile phone of the second embodiment is the same as the mobile phone of the first embodiment. When the input device (20) of the first embodiment is fixed in the first position, the main body (1) completely covers the front side and back side of the hidden portion (40). In FIG. 5 and FIG. 6, however, when the input device (20) of the second embodiment is fixed in the first position, the main body (10) does not cover the backside of the hidden portion (40), but only covers the second input elements, which comprises a plurality of keys (42) and a touch pad (44). Therefore, the structure of the present invention is not limited to the structure mentioned above. The feature of present invention is that the main body (10) covers the second input elements of the hidden portion (40) when the input device (20) is fixed in the first position, and the hidden portion (40) is exposed when the input device (20) is fixed in the second position.

Figure 7:
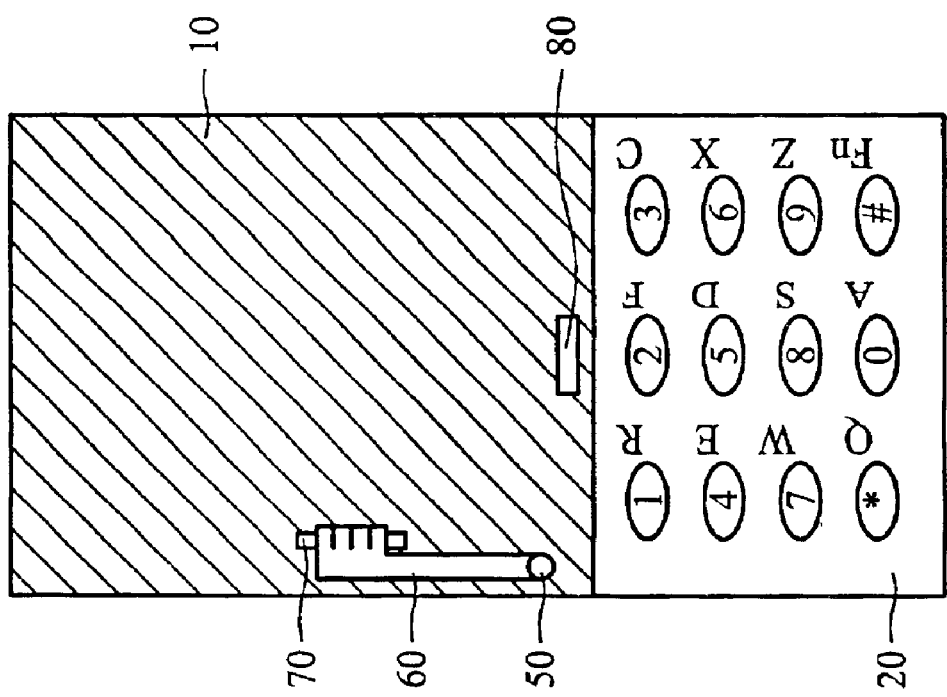
FIG. 7 is a partial section view of the input keyboard in the first position of the third embodiment.
Figure 8:
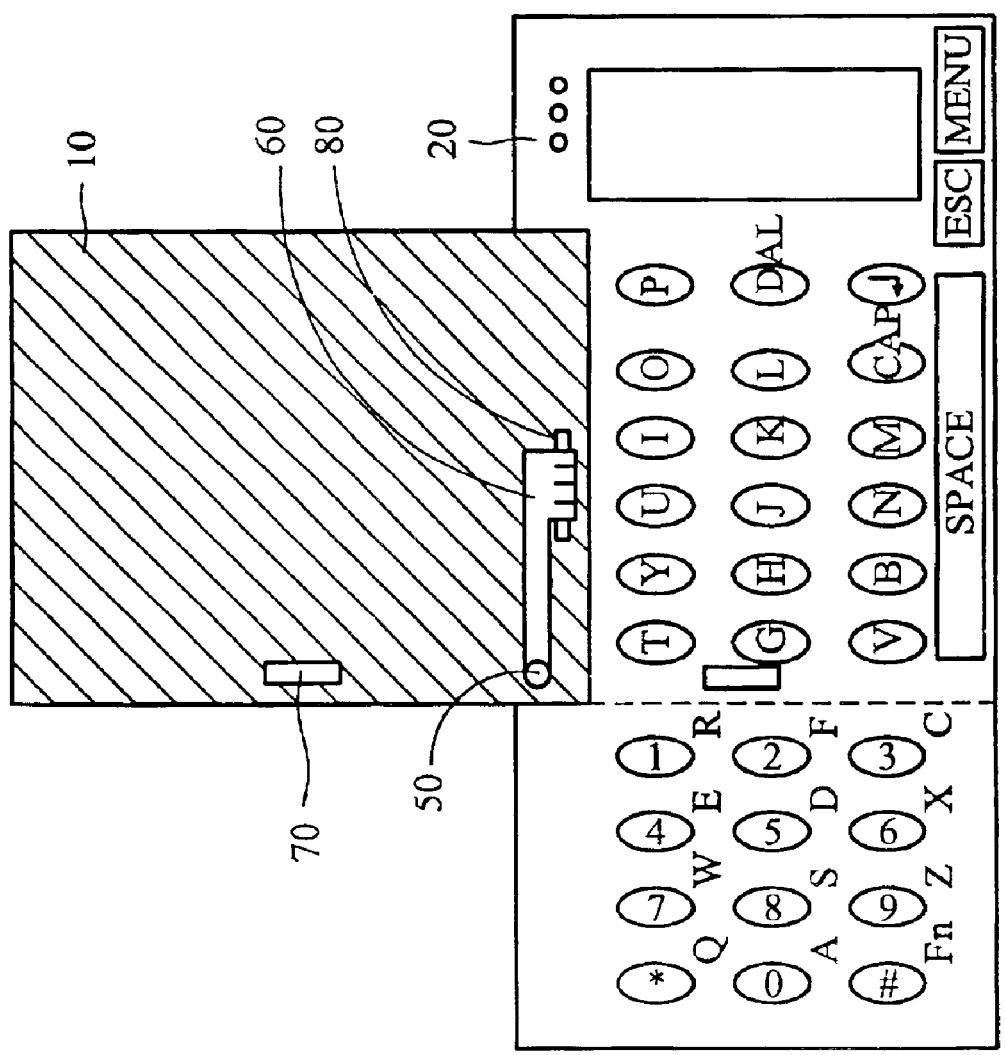
FIG. 8 is a partial section view of the input keyboard in the second position of the third embodiment.

FIG. 7 is a partial section view of the input keyboard in the first position of the third embodiment, and FIG. 8 is a partial section view of the input keyboard in the second position of the third embodiment. In FIG. 7 and FIG. 8, the structure of the third embodiment is similar to the structure of the first embodiment. In the third embodiment, the input device (20) of the mobile phone (1) comprises a flexible printed circuit board (FPC) (60), and the main body (10) comprises a first node (70) and a second node (80). The flexible printed circuit board (60) is used to transmit the signal from the input device (20) through the first node (70) or the second node (80) to the main body (10).

In FIG. 7, the flexible printed circuit board (60) conducts to the first node (70) when the input device (20) is fixed in the first position so that the first node (70) of the main body (10) receives only the signals including "1", "2", "3", "4", "5", "6", "7", "8", "9", "0", "*", and "#".

In FIG. 8, the flexible printed circuit board (60) conducts to the second node (80) when the input device (20) is fixed in the second position so that the second node (80) of the main body (10) receives the signal from the complete alphabetical keyboard made up by the visible portion (30) and a hidden portion (40) such as alphabetical characters, "A" to "Z", or specific function keys, "Fn" or "CAP".

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A mobile phone with a hidden input device, comprising:
    a main body, and
    an input device, coupled to the main body to input data and rotatably connected to the main body between a first position and a second position by a rotating device, wherein the input device has a visible portion with a plurality of first input elements and a hidden portion with a plurality of second input elements covered by the main body when the input device is fixed in the first position and appearing when the input device is fixed in the second position, wherein
    both the first input elements and the second input elements are accessible at the same time when said input device is fixed in the second position.

2. The mobile phone as claimed in claim 1, wherein the first input elements comprise a plurality of keys.

3. The mobile phone as claimed in claim 1, wherein the second input elements comprise a plurality of keys.

4. The mobile phone as claimed in claim 1, wherein the second input elements comprise a touch pad.

5. The mobile phone as claimed in claim 1, wherein the first input elements input numbers when the input device is fixed in the first position, and the first elements and the second elements input alphabetical characters and a plurality of specific functional options.

6. The mobile phone as claimed in claim 1, wherein the rotating device is a shaft.

7. The mobile phone as claimed in claim 1, wherein the input device comprises a flexible printed circuit board to transmit the signal from the input device to the body.

8. The mobile phone as claimed in claim 7, wherein the the main body comprises a first node and a second node, wherein the first node conducts the flexible printed circuit board of the input device in the first position to receive the signal from the input device in the first position, and the second node conducts the flexible printed circuit board of the input device in the second position to receive the signal from the input device in the second position.

* * * * *